(12) United States Patent
Wright et al.

(10) Patent No.: US 9,737,123 B2
(45) Date of Patent: Aug. 22, 2017

(54) WATERPROOF CASE FOR ELECTRONIC DEVICE

(71) Applicant: CATALYST LIFESTYLE LIMITED, North Point (HK)

(72) Inventors: Joshua Wright, Hong Kong (CN); June Lai, Hong Kong (CN)

(73) Assignee: CATALYST LIFESTYLE LIMITED, North Point, Hong Kong (CN)

( * ) Notice: Subject to any disclaimer, the term of this patent is extended or adjusted under 35 U.S.C. 154(b) by 2 days.

(21) Appl. No.: 15/176,937

(22) Filed: Jun. 8, 2016

(65) Prior Publication Data
US 2017/0035156 A1    Feb. 9, 2017

Related U.S. Application Data

(60) Provisional application No. 62/259,297, filed on Nov. 24, 2015, provisional application No. 62/200,888, filed on Aug. 4, 2015.

(51) Int. Cl.
| | |
|---|---|
| *H04B 1/3888* | (2015.01) |
| *G04B 37/00* | (2006.01) |
| *G04B 37/10* | (2006.01) |
| *A45C 13/00* | (2006.01) |
| *A45C 11/00* | (2006.01) |

(Continued)

(52) U.S. Cl.
CPC ...... *A45C 13/008* (2013.01); *A45C 2011/001* (2013.01); *A45C 2011/002* (2013.01); *A45C 2200/10* (2013.01); *A45F 2005/008* (2013.01); *A45F 2200/0508* (2013.01); *A45F 2200/0516* (2013.01); *G04B 37/005* (2013.01); *G04B 37/10* (2013.01); *G04G 17/08* (2013.01); *H04B 2001/3894* (2013.01)

(58) Field of Classification Search
CPC ..... H04B 2001/3894; A45F 2200/0516; A45F 2005/008; G04B 37/005; G04B 37/10; G04G 17/08
See application file for complete search history.

(56) References Cited

U.S. PATENT DOCUMENTS

| | | |
|---|---|---|
| 1,195,299 A | 8/1916 | Watcher |
| 1,205,217 A | 11/1916 | Kaufman |

(Continued)

FOREIGN PATENT DOCUMENTS

| | | |
|---|---|---|
| CH | 218928 | 4/1942 |
| CH | 343949 | 2/1960 |

(Continued)

*Primary Examiner* — Justin Larson
(74) *Attorney, Agent, or Firm* — Dinsmore & Shohl LLP

(57) ABSTRACT

A waterproof case for an electronic device that includes an upper housing member and a lower housing member including lugs formed thereon attaching to a strap member. A sealing wrap is positioned about an electronic device. The sealing wrap is positioned between the upper and lower housing members when the upper and lower housing members are coupled. The sealing wrap includes an alignment feature formed thereon. The alignment feature engages the upper or lower housing member and positions the wrap within the upper and lower housing members wherein axial seal members formed on the wrap are compressed and engage the device when the upper and lower housing members are coupled defining a continuous seal about the device.

26 Claims, 18 Drawing Sheets

(51) Int. Cl.
    *H04B 1/38*    (2015.01)
    *G04G 17/08*   (2006.01)
    *A45F 5/00*    (2006.01)

(56) References Cited

U.S. PATENT DOCUMENTS

| | | | |
|---|---|---|---|
| 1,986,328 A | 1/1935 | Dreyfus | |
| 2,136,625 A | 11/1938 | Lasko | |
| D157,606 S | 3/1950 | Lachman | |
| 3,194,004 A * | 7/1965 | Church | G04B 37/005 368/281 |
| 3,640,065 A * | 2/1972 | Lederrey | G04B 37/055 368/292 |
| 4,062,181 A * | 12/1977 | Zurcher | G04C 3/005 200/345 |
| 4,236,239 A | 11/1980 | Imgruth et al. | |
| 5,206,841 A * | 4/1993 | Boucheron | G04B 37/005 368/276 |
| D341,092 S | 11/1993 | Wild | |
| D351,799 S | 10/1994 | Bulgari | |
| 5,392,261 A * | 2/1995 | Hsu | G04B 37/1413 368/281 |
| D386,094 S | 11/1997 | Ventrella | |
| 6,068,119 A | 5/2000 | Derr et al. | |
| 6,267,236 B1 | 7/2001 | Seok | |
| 6,349,824 B1 | 2/2002 | Yamada | |
| 6,655,831 B1 * | 12/2003 | Ruffieux | G04B 37/116 368/281 |
| 6,659,274 B2 * | 12/2003 | Enners | G06F 1/1626 206/305 |
| 6,698,608 B2 * | 3/2004 | Parker | A45C 13/008 220/23.87 |
| D507,975 S | 8/2005 | Dreyfuss | |
| 7,106,197 B2 * | 9/2006 | Gaiotto | B64D 45/0015 340/539.11 |
| D531,524 S * | 11/2006 | Behling | D10/38 |
| D539,671 S | 4/2007 | Lassigne | |
| D564,367 S | 3/2008 | Molyneux | |
| 7,555,325 B2 | 6/2009 | Goros | |
| 7,577,468 B2 * | 8/2009 | Begic | H04M 1/0252 379/433.11 |
| 7,594,576 B2 * | 9/2009 | Chen | G06F 1/1628 206/305 |
| 7,613,386 B2 * | 11/2009 | Shimamura | G03B 17/08 206/316.2 |
| 7,630,746 B2 | 12/2009 | Holmberg | |
| D616,417 S * | 5/2010 | Liao | D14/203.5 |
| 7,708,457 B2 * | 5/2010 | Girardin | G04B 37/0058 368/287 |
| 7,933,122 B2 | 4/2011 | Richardson et al. | |
| D638,312 S | 5/2011 | Jacobs | |
| D638,324 S | 5/2011 | Tang | |
| 7,946,758 B2 | 5/2011 | Mooring | |
| D657,262 S | 4/2012 | Pulli | |
| D666,924 S | 9/2012 | Ahlstrom | |
| 8,292,493 B2 * | 10/2012 | Mooring | G04B 37/005 368/276 |
| D672,255 S | 12/2012 | Zanella et al. | |
| D672,265 S | 12/2012 | Pulli | |
| D673,477 S | 1/2013 | Szellos | |
| 8,342,325 B2 | 1/2013 | Rayner | |
| 8,345,412 B2 | 1/2013 | Maravilla et al. | |
| D683,338 S | 5/2013 | Wilson et al. | |
| D688,582 S | 8/2013 | Wilson | |
| D688,967 S | 9/2013 | Wilson | |
| D699,701 S * | 2/2014 | Kim | D14/203.7 |
| D709,057 S | 7/2014 | Wilson et al. | |
| 8,787,009 B2 | 7/2014 | Wilson et al. | |
| D716,786 S | 11/2014 | Wilson et al. | |
| 8,944,614 B2 * | 2/2015 | Parrill | G02B 23/16 359/511 |
| 8,955,678 B2 * | 2/2015 | Murphy | B23P 19/00 206/320 |
| 8,967,437 B2 | 3/2015 | Wilson | |
| D727,194 S | 4/2015 | Wilson | |
| 9,004,329 B2 * | 4/2015 | Hsieh | G04G 17/08 224/169 |
| 9,007,758 B2 | 4/2015 | Wilson et al. | |
| D729,218 S | 5/2015 | Wilson et al. | |
| 9,101,184 B2 | 8/2015 | Wilson | |
| 9,114,923 B2 * | 8/2015 | Richardson | G06F 1/1626 |
| D739,768 S | 9/2015 | Hanshew et al. | |
| 9,136,897 B2 * | 9/2015 | Hynecek | H04B 1/3888 |
| 9,145,250 B2 * | 9/2015 | Richardson | G06F 1/1626 |
| 9,155,368 B2 * | 10/2015 | Chang | A45C 11/22 |
| D742,254 S | 11/2015 | Greusel et al. | |
| D742,761 S | 11/2015 | Grazian et al. | |
| 9,223,346 B2 | 12/2015 | Wilson | |
| D751,067 S | 3/2016 | Nousiainen | |
| D751,558 S | 3/2016 | Lee | |
| D752,044 S | 3/2016 | Akana et al. | |
| D752,579 S | 3/2016 | Lee | |
| D752,996 S | 4/2016 | Ebersold | |
| D756,357 S | 5/2016 | Akana et al. | |
| 9,386,932 B2 * | 7/2016 | Chatterjee | G06F 1/1626 |
| 2002/0065054 A1 | 5/2002 | Humphreys et al. | |
| 2005/0116003 A1 * | 6/2005 | Butler | A45C 11/22 224/604 |
| 2009/0080153 A1 * | 3/2009 | Richardson | H04M 1/18 361/679.56 |
| 2009/0302799 A1 * | 12/2009 | Marquet | A45F 5/02 320/101 |
| 2012/0073093 A1 | 3/2012 | Szellos | |
| 2012/0074005 A1 | 3/2012 | Johnson et al. | |
| 2012/0134244 A1 * | 5/2012 | Margaritelli | G04B 37/005 368/281 |
| 2013/0001263 A1 | 1/2013 | Kai | |
| 2015/0137731 A1 * | 5/2015 | Kim | H02J 7/355 320/101 |
| 2015/0141096 A1 * | 5/2015 | Murphy | B23P 19/00 455/575.8 |
| 2015/0214991 A1 * | 7/2015 | Ranchod | H04M 1/04 455/575.8 |
| 2015/0296963 A1 * | 10/2015 | Byun | G04G 17/08 224/191 |
| 2015/0319520 A1 * | 11/2015 | Richardson | G06F 1/1626 381/384 |
| 2016/0254836 A1 * | 9/2016 | Alsberg | H04B 1/3888 |

FOREIGN PATENT DOCUMENTS

| | | |
|---|---|---|
| CH | 590 870 A5 | 2/2001 |
| CN | 203119956 U | 8/2013 |
| CN | 203708299 U | 7/2014 |
| CN | 204190798 U | 3/2015 |
| CN | 204305125 U | 4/2015 |
| DE | 322169 | 11/1951 |
| JP | 3046371 A | 2/1996 |
| JP | 9023072 | 1/1997 |
| JP | 3044740 U | 1/1998 |
| JP | 10079582 A | 3/1998 |
| JP | 11231970 A | 8/1999 |
| JP | 11231973 A | 8/1999 |
| JP | 11284358 A | 10/1999 |
| JP | 2000125916 A | 5/2000 |
| JP | 2006064762 A | 3/2006 |
| WO | 99/67889 A1 | 12/1999 |
| WO | 03041288 A2 | 5/2003 |

* cited by examiner

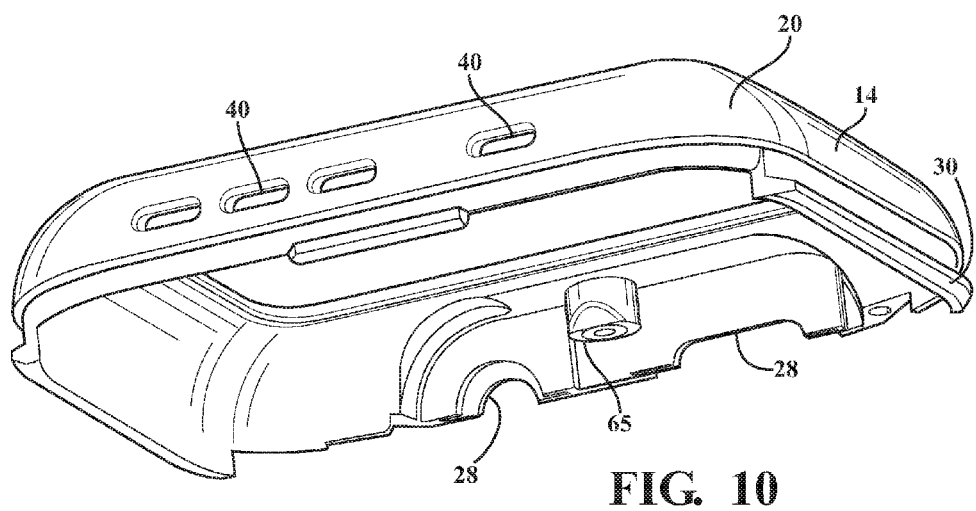
FIG. 10
FIG. 11
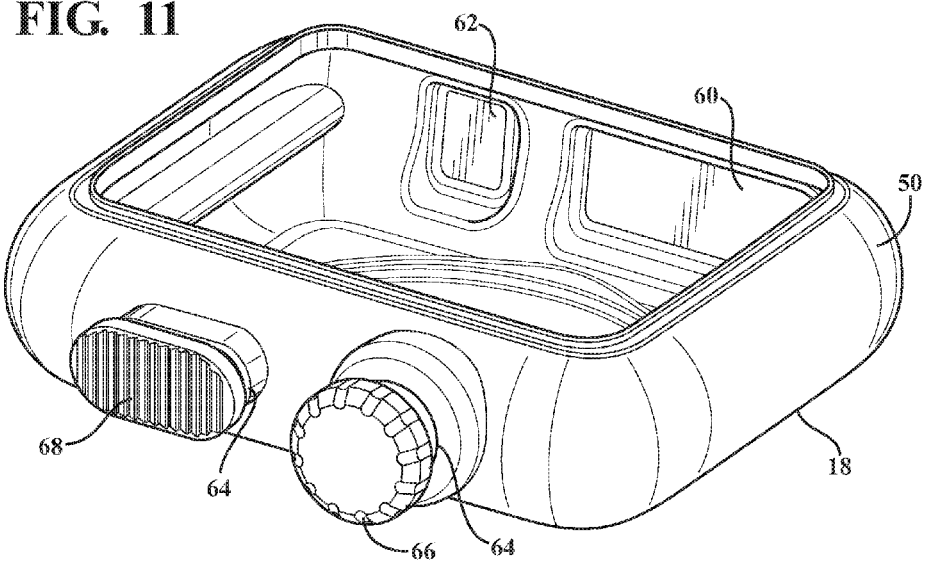

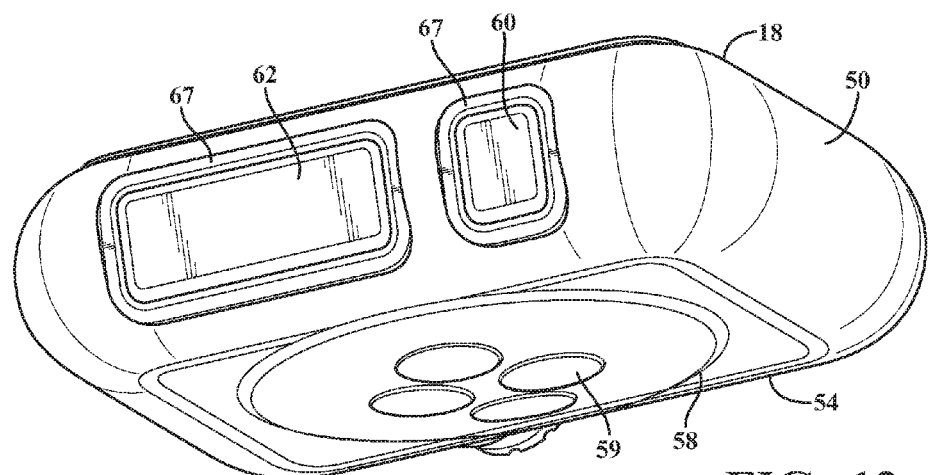
FIG. 12
FIG. 13
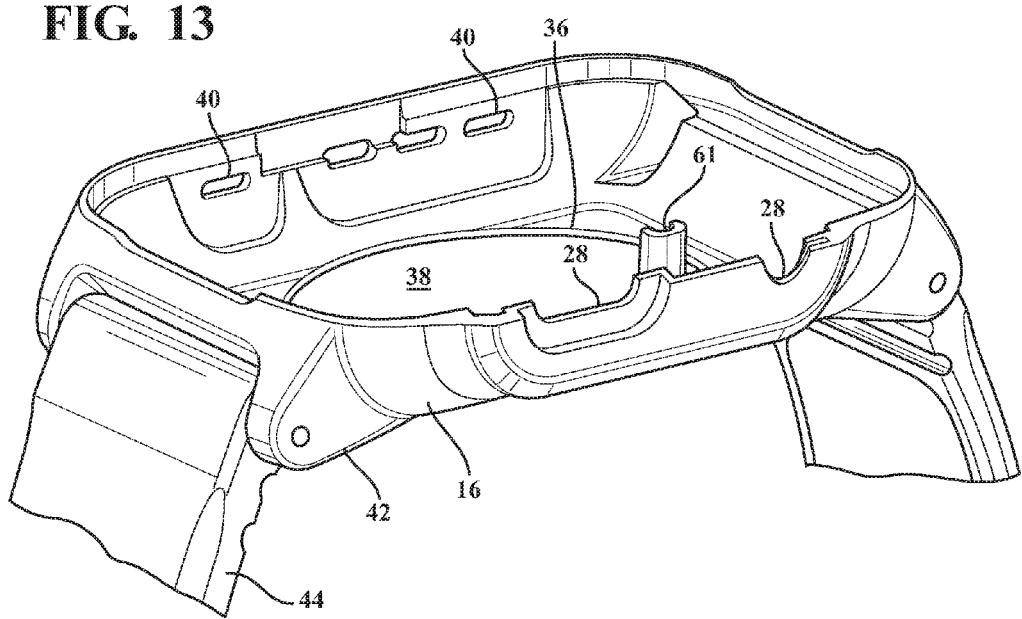

WATERPROOF CASE FOR ELECTRONIC DEVICE

CROSS-REFERENCE TO RELATED APPLICATIONS

This application claims priority of U.S. Provisional Patent Application 62/200,888 filed Aug. 4, 2015, and U.S. Provisional Patent Application 62/259,297 filed Nov. 24, 2015, the disclosure of which are incorporated by reference herein in their entirety.

FIELD OF THE INVENTION

The invention relates to waterproof cases for an electronic device.

BACKGROUND OF THE INVENTION

Waterproof housings for various devices are known in the art. However such waterproof housings are not specifically designed for the actuation of toggles or screens of the enclosed electronic device and to provide a clear transmission of sound from the interior of the case to an exterior of the case and/or from the exterior to the interior of the case. There is therefore a need in the art for a water tight case that has an improved sound transmission and allows a user to actuate various portions of the device while positioned within the case. In another aspect there is a need in the art for a waterproof housing that may be worn on the wrist of a user and seal the device within the case and allow access to a screen of the electronic device while remaining sealed. There is a further need in the art for a waterproof case that includes sealed toggles that actuate a device positioned within the case. There is also a need in the art for a waterproof case member that may be worn on the wrist of a user and allow transmission of light through any surface of the case while the device in the case remains sealed from the environment.

SUMMARY OF THE INVENTION

In one aspect, there is disclosed a waterproof case for an electronic device that includes an upper housing member and a lower housing member. A sealing wrap is positioned about an electronic device. The sealing wrap is positioned between the upper and lower housing members when the upper and lower housing members are coupled. The sealing wrap includes an alignment feature formed thereon. The alignment feature engages the upper housing member and positions the wrap within the upper and lower housing members wherein axial seal members formed on the wrap are compressed and engage the device when the upper and lower housing members are coupled defining a continuous seal about the device.

In another aspect, there is disclosed a waterproof case for an electronic device that includes an upper housing member and a lower housing member. A sealing wrap is positioned about an electronic device. The sealing wrap is positioned between the upper and lower housing members when the upper and lower housing members are coupled. The sealing wrap includes acoustic membranes monolithically formed thereon. The acoustic membranes are compliantly formed transmitting sound into and out of the waterproof case from the device.

In a further aspect, there is disclosed a waterproof case for an electronic device that includes an upper housing member and a lower housing member. A sealing wrap is positioned about an electronic device. The sealing wrap is positioned between the upper and lower housing members when the upper and lower housing members are coupled. The sealing wrap includes a wall having a thin walled section formed thereon, the thin walled section having transparent portions allowing the transmission of light.

In yet another aspect, there is disclosed a waterproof case for an electronic device that includes an upper housing member and a lower housing member. A sealing wrap is positioned about an electronic device. The sealing wrap is positioned between the upper and lower housing members when the upper and lower housing members are coupled. The upper and lower housing members include cutout slots formed therein accommodating a dial toggle and a button toggle wherein the dial toggle includes an actuator portion that extends along a cylindrical portion to a friction contact portion that engages a rotating feature on the device. The cylindrical portion is received in a toggle slot formed in the sealing wrap. The sealing wrap includes waterproof seal structures positioned about the toggle slot sealing about the cylindrical portion.

BRIEF DESCRIPTION OF THE DRAWINGS

FIG. 10 is a partial perspective view of a waterproof case detailing the upper housing;

FIG. 11 is a partial perspective view of a waterproof case detailing the sealing wrap;

FIG. 12 is a partial perspective view of a waterproof case detailing the sealing wrap;

FIG. 13 is a partial perspective view of a waterproof case detailing the lower housing;

DETAILED DESCRIPTION OF THE PREFERRED EMBODIMENTS

Referring to the various figures, there is shown a waterproof case 10 for an electronic device 12. The waterproof case 10 includes upper and lower housing members 14, 16. The waterproof case 10 also includes a sealing wrap 18 that is disposed about the electronic device 12 and positioned within the upper and lower housing members 14, 16 when assembled.

Figure 1:
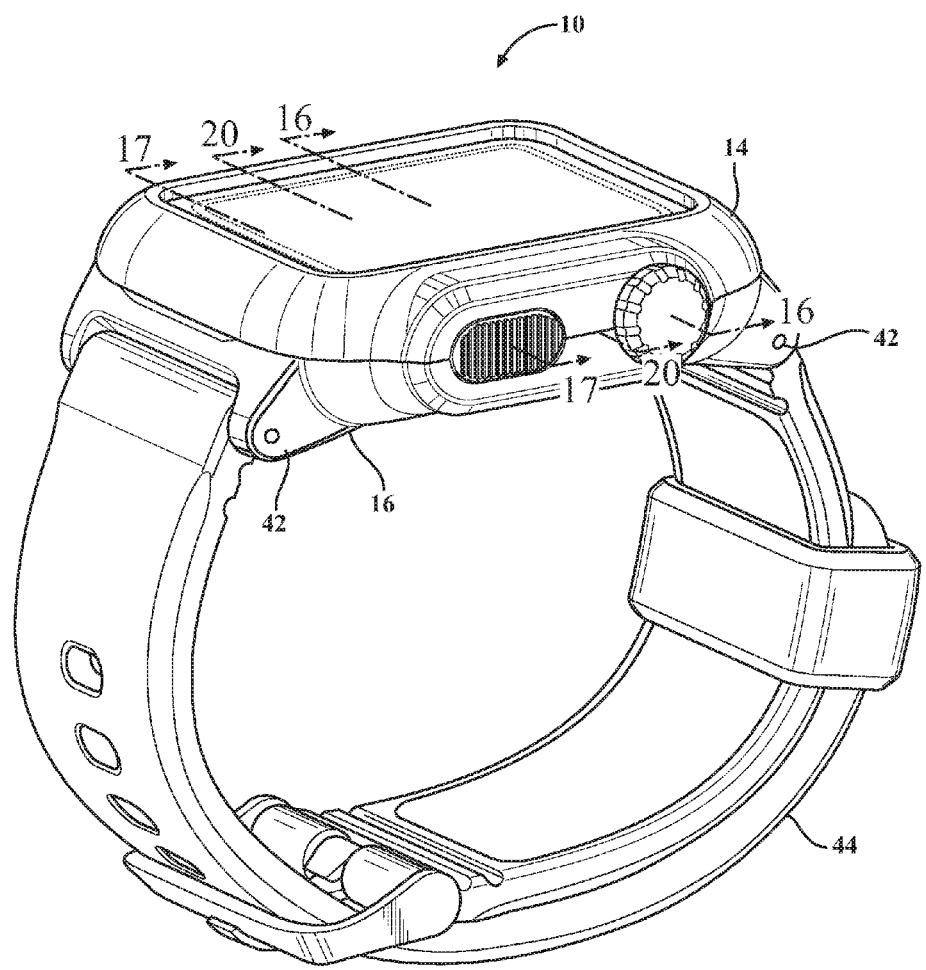
FIG. 1 is a perspective view of a waterproof case detailing the upper and lower housing.
Figure 2:
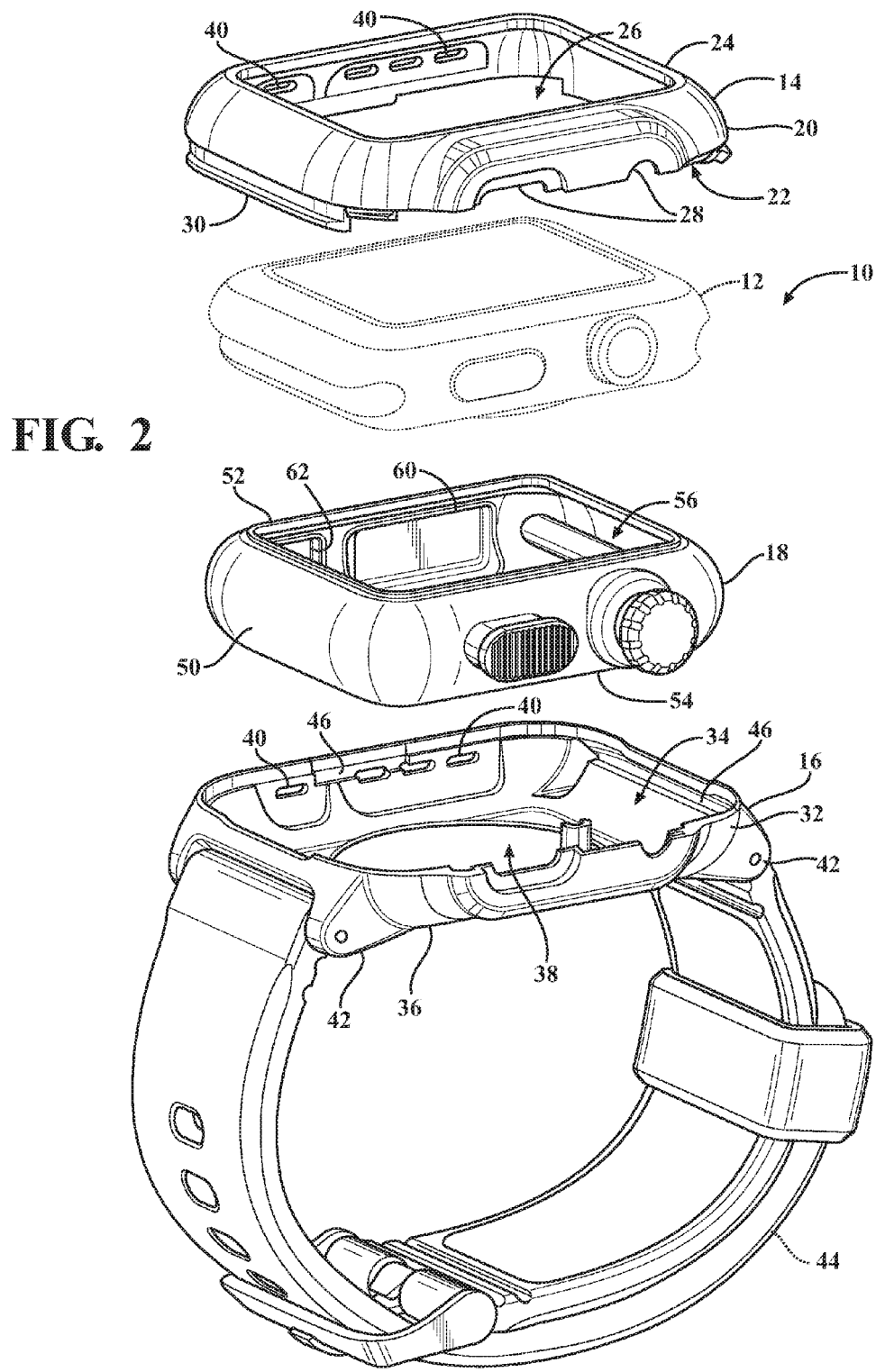
FIG. 2 is an exploded perspective view of a waterproof case detailing the upper and lower housing and wrap.
Figure 3:
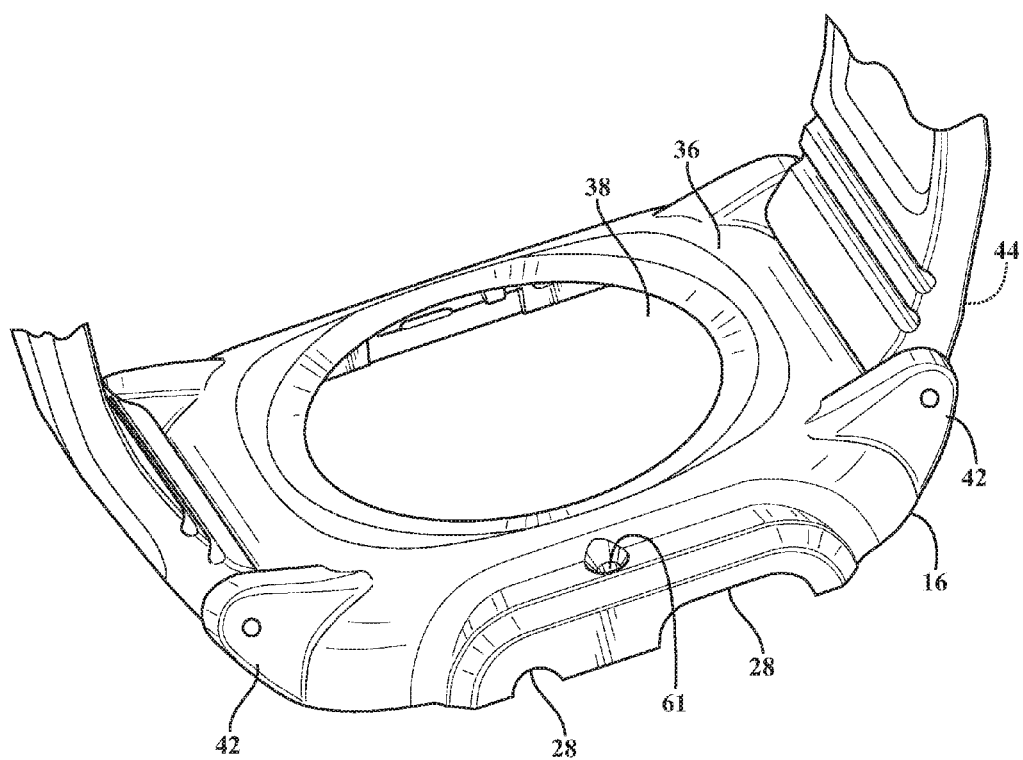
FIG. 3 is a partial perspective view of a waterproof case detailing the lower housing.
Figure 4:
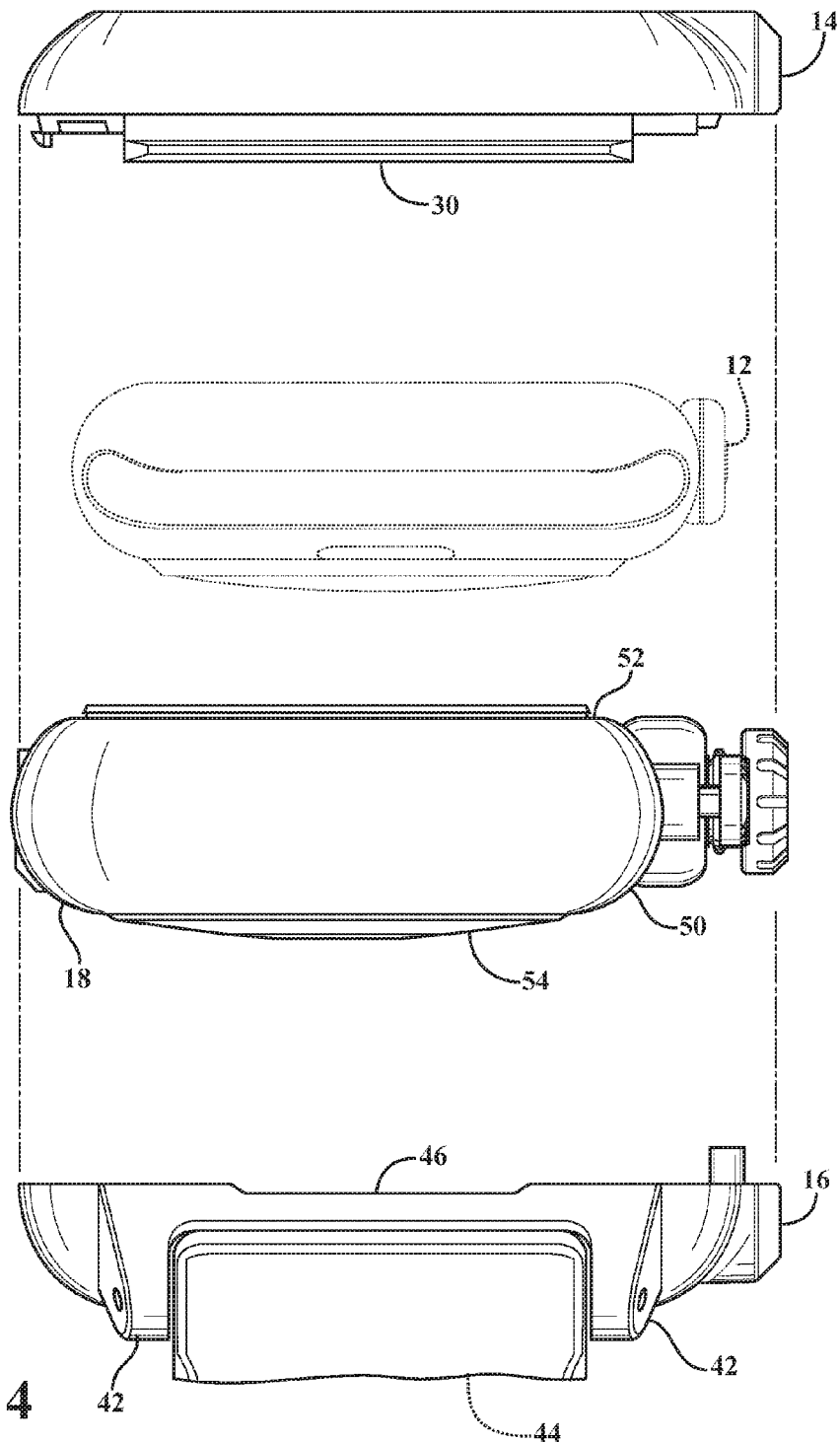
FIG. 4 is an exploded front view of a waterproof case detailing the upper and lower housing and wrap.
Figure 5:
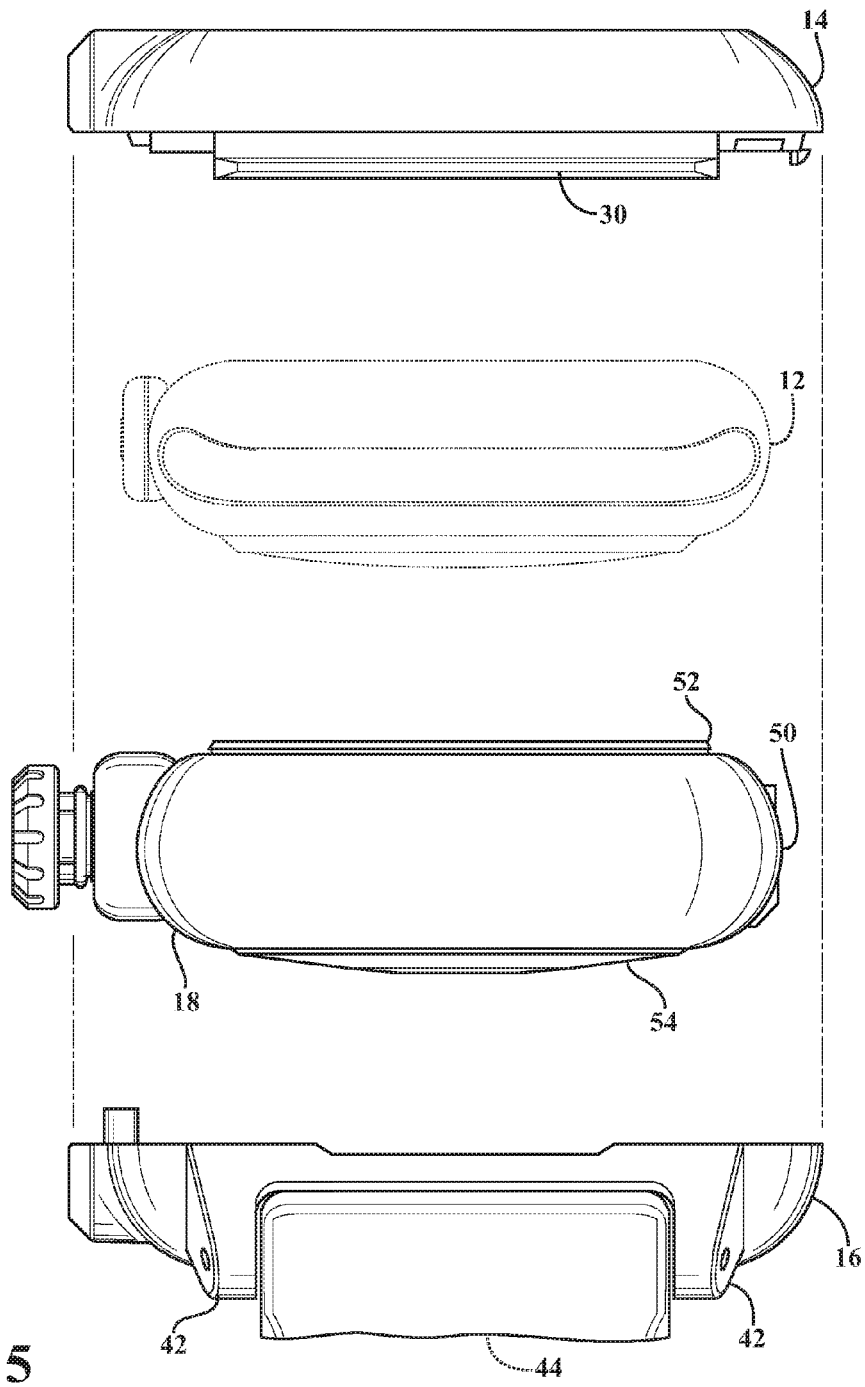
FIG. 5 is an exploded rear view of a waterproof case detailing the upper and lower housing and wrap.
Figure 6:
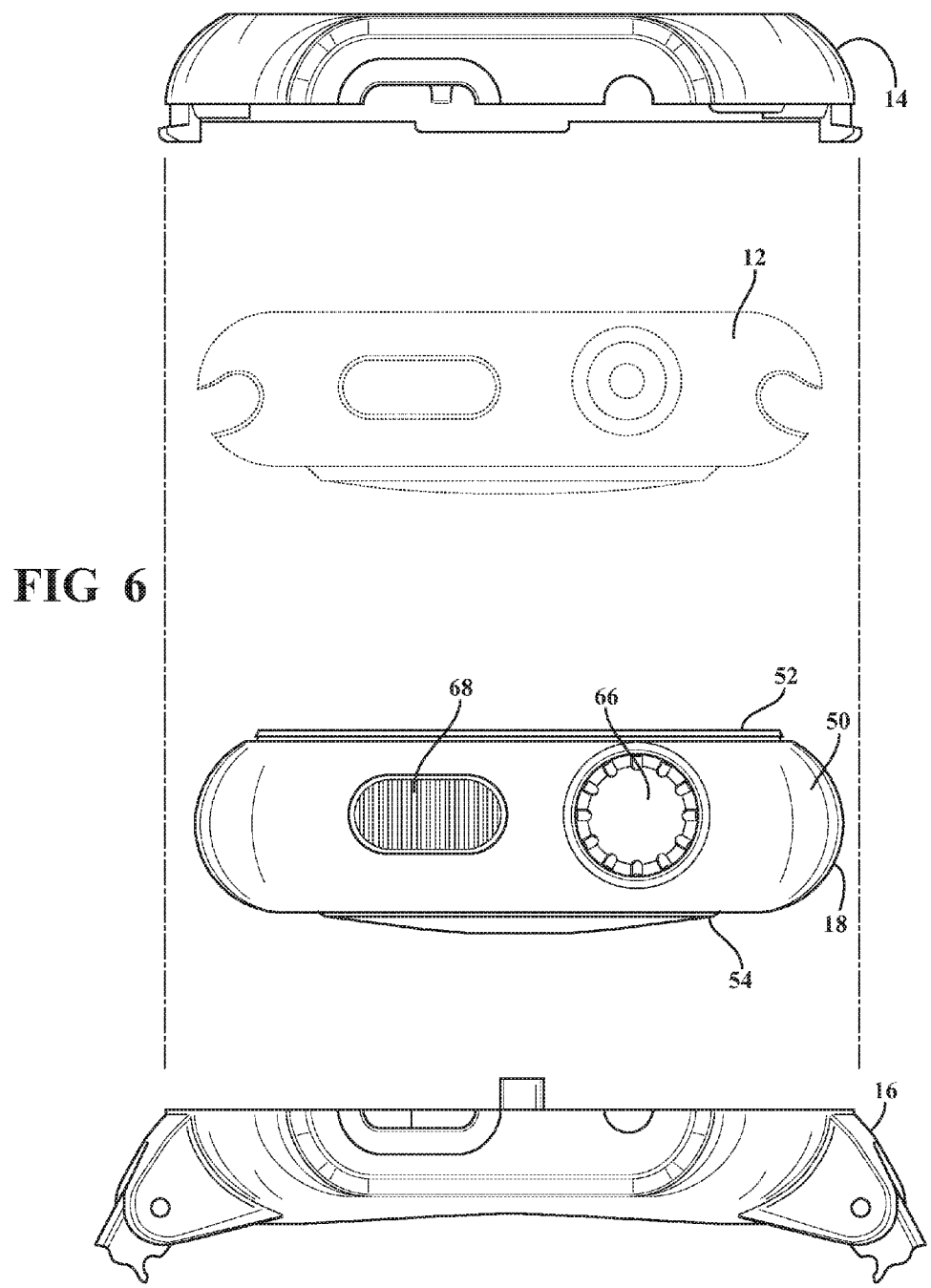
FIG. 6 is an exploded side view of a waterproof case detailing the upper and lower housing and wrap.
Figure 7:
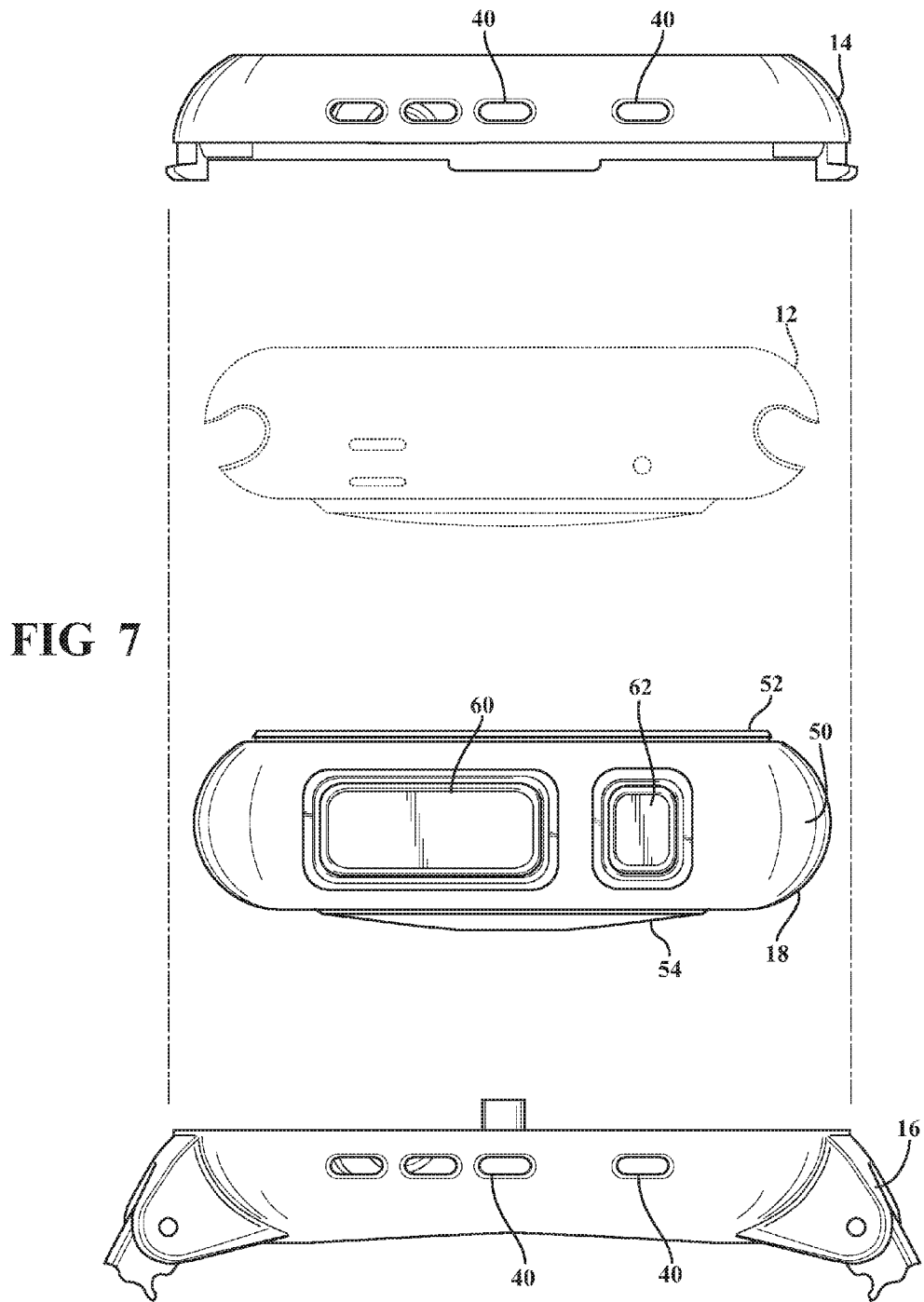
FIG. 7 is an exploded opposing side view of a waterproof case detailing the upper and lower housing and wrap.
Figure 8:
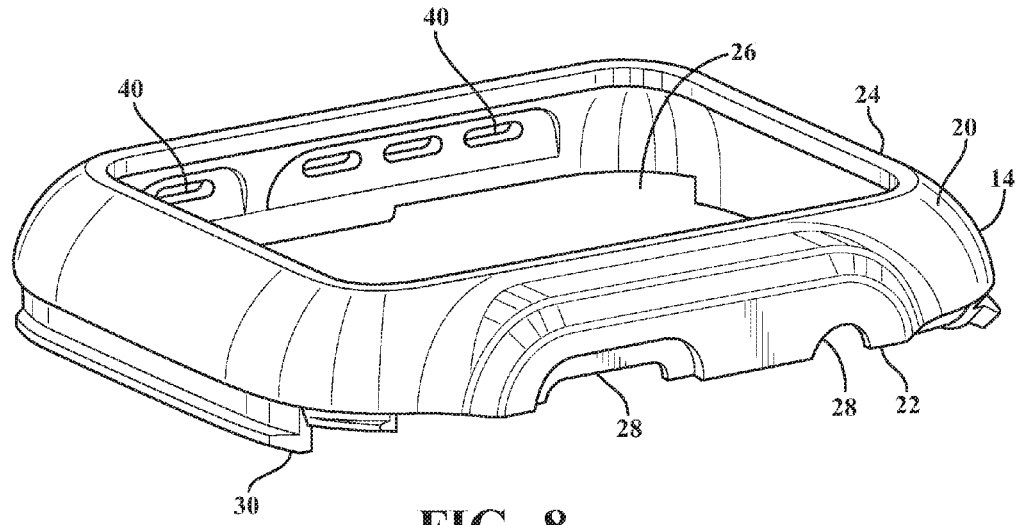
FIG. 8 is a partial perspective view of a waterproof case detailing the upper housing.
Figure 9:
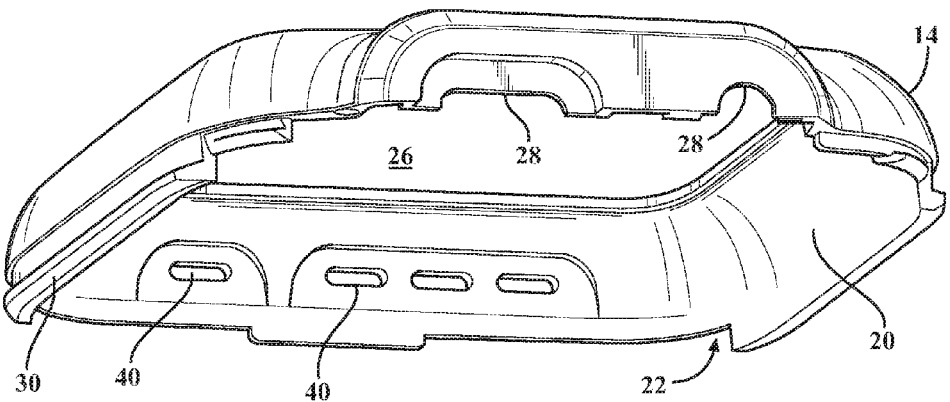
FIG. 9 is a partial perspective view of a waterproof case detailing the upper housing.
Figure 14:
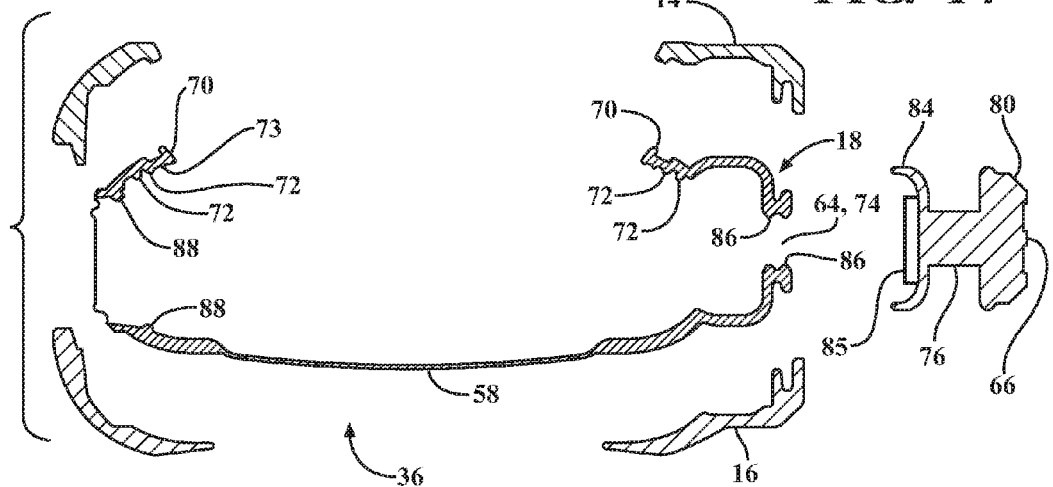
FIG. 14 is an exploded sectional view of the case for the electronic device detailing a dial toggle.
Figure 15:
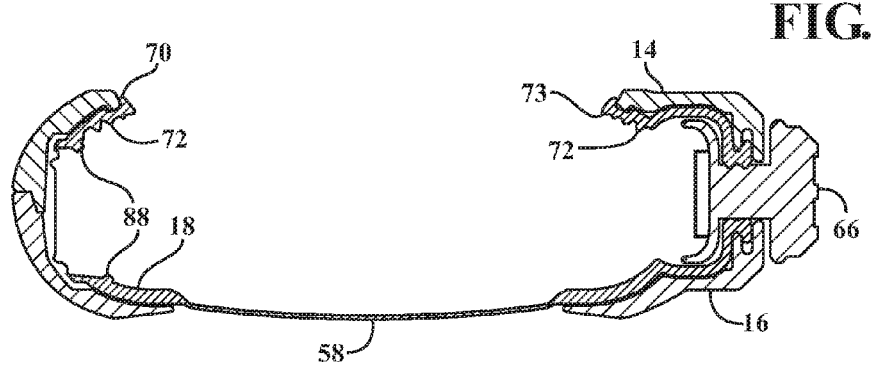
FIG. 15 is an assembled sectional view of the case for the electronic device detailing a dial toggle.
Figure 16:
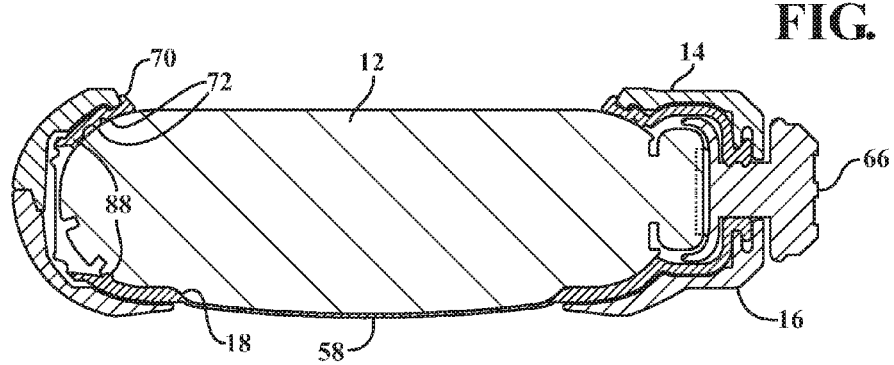
FIG. 16 is an assembled sectional view of the case for the electronic device detailing a dial toggle and electronic device.

In one aspect, as shown in FIGS. 8-10, the upper housing member 14 may include a continuous peripheral wall 20 that has an open bottom 22 that curves upward to a top portion 24 of the housing member. In one aspect, the top portion 24 includes a cutout 26 allowing access to the electronic device 12. The continuous peripheral wall 20 may include cutouts or slots 28 formed therein to accommodate additional button or toggle features as will be discussed in more detail below. Additionally, the peripheral wall 20 may include connection structures 30 positioned about the perimeter of the peripheral wall 20 to couple with the lower housing member 16. The peripheral wall 20 of the upper housing 14 also includes acoustic slots 40 formed therein to allow transfer of acoustic energy between the interior and exterior of the case 10. The upper and lower housing materials may be selected with Young's Modulus from 50 MPa up to 100 GPa and a density from 500 kg/m3 up to 10000 kg/m3. The material used for the housing parts will require sufficient strength and rigidity to provide protection for the electronic device. Examples of such materials include ABS, PC, PVC, PP, HIPS, PEEK, PI, PEI, PS, Polyamides, LCPs, Acrylics, polyurethanes, phenolics, thermosets, thermoplastic elastomers such as TPE/TPU), ceramics and fiber-reinforced composites. The materials discussed above may also be reinforced with short or long fibers to provide additional strength and stability. Metals such as aluminum alloys, steels, stainless steel, brass, titanium alloys and metal matrix composites may also be used. Some metals may affect the transmission of electromagnetic waves and RF signals between the electronic device inside the case and other devices and this should be considered when selecting the housing material. The lower housing member 16, as shown in FIG. 2 also includes a peripheral wall 32 that extends from an open top portion 34 to a lower wall 36. In one aspect, the lower wall 36 includes an opening 38 formed therein. The peripheral wall 32 of the lower housing 16 also includes acoustic slots 40 formed therein to allow transfer of acoustic energy between the interior and exterior of the case 10. In one aspect, the lower housing 16 may include lugs 42 formed thereon for attaching to a strap member 44. Alternatively, the lugs 42 may be positioned on the upper housing member 14. The lower housing member 16 may also include connection structures 46 that mate with the connection structures 30 of the upper housing member 14 as best shown in FIGS. 19-21.

Figure 19:
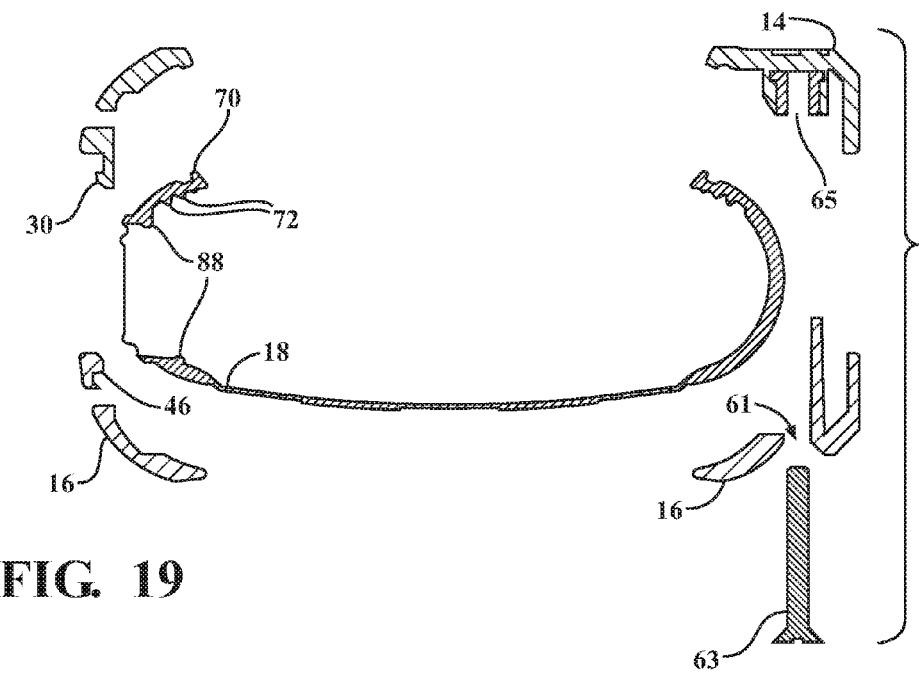
FIG. 19 is an exploded sectional view of the case for the electronic device detailing a connection structure and acoustic structures.
Figure 20:
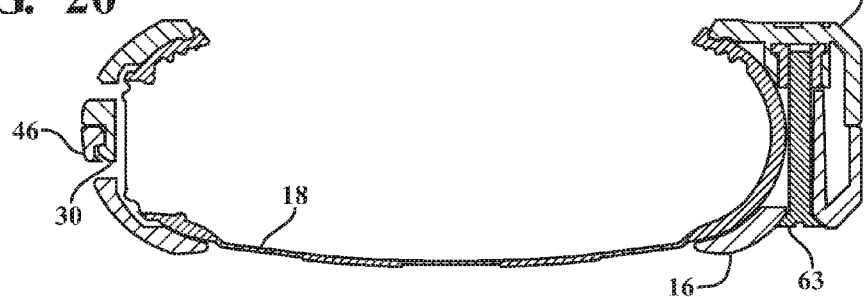
FIG. 20 is an assembled sectional view of the case for the electronic device detailing a connection structure and acoustic structures.
Figure 21:
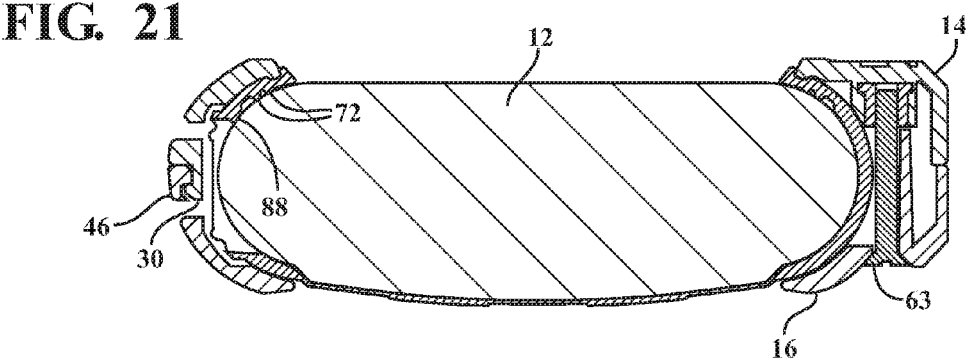
FIG. 21 is an assembled sectional view of the case for the electronic device detailing a connection structure and acoustic structures and a device.

The lower housing may also include a slot 61 formed therein that receives a screw 63 that is received in a threaded bore 65 of the upper housing 14 as best shown in FIGS. 19-21. The screw 63 may be utilized to assure connection of the upper and lower housing 14, 16 when a torsional or uneven load is applied to the housings 14, 16 or when the wrap 18 is positioned between the upper and lower housings 14, 16.

Figure 22:
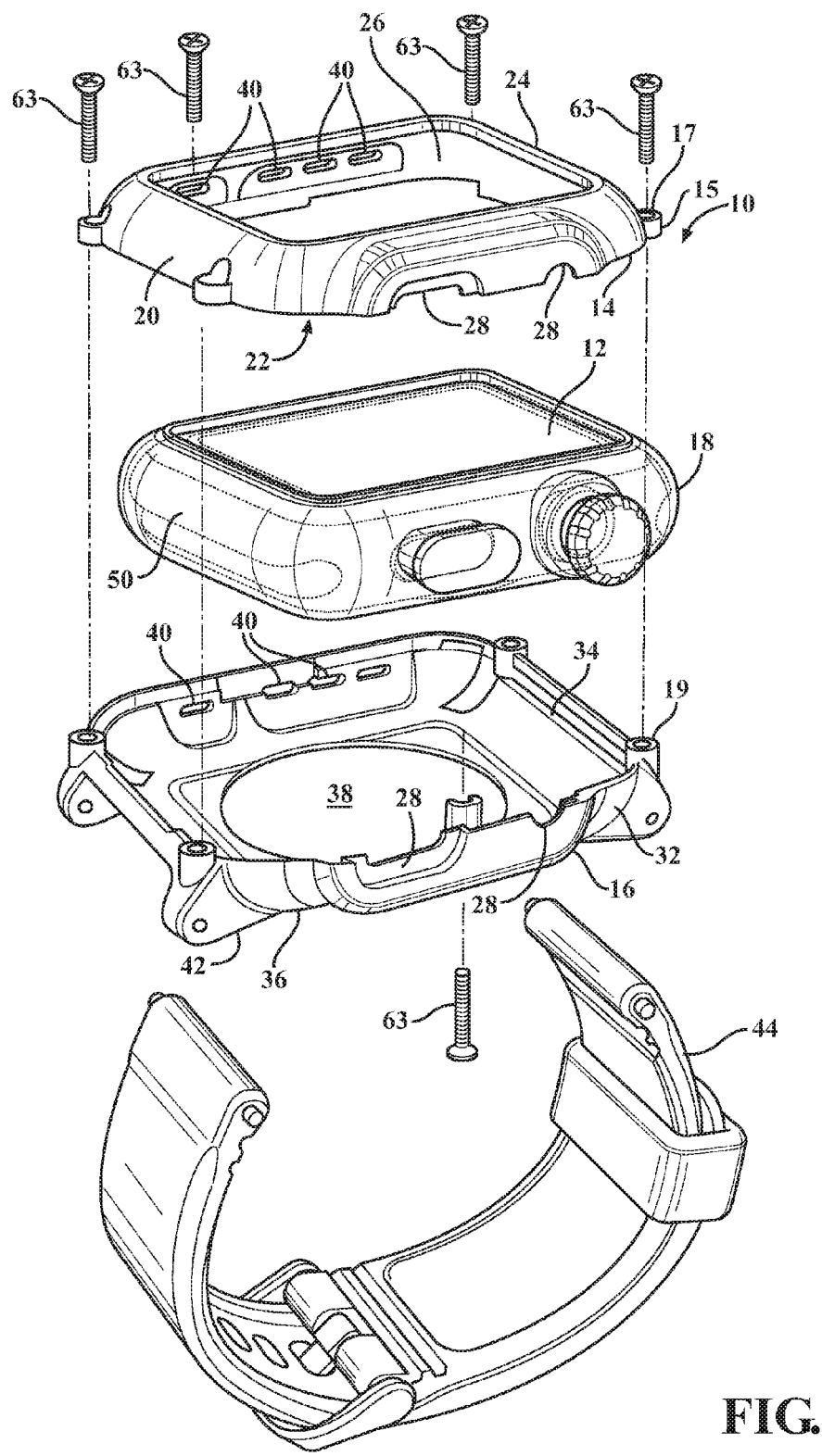
FIG. 22 is an exploded perspective view of an embodiment including attachment screws.
Figure 23:
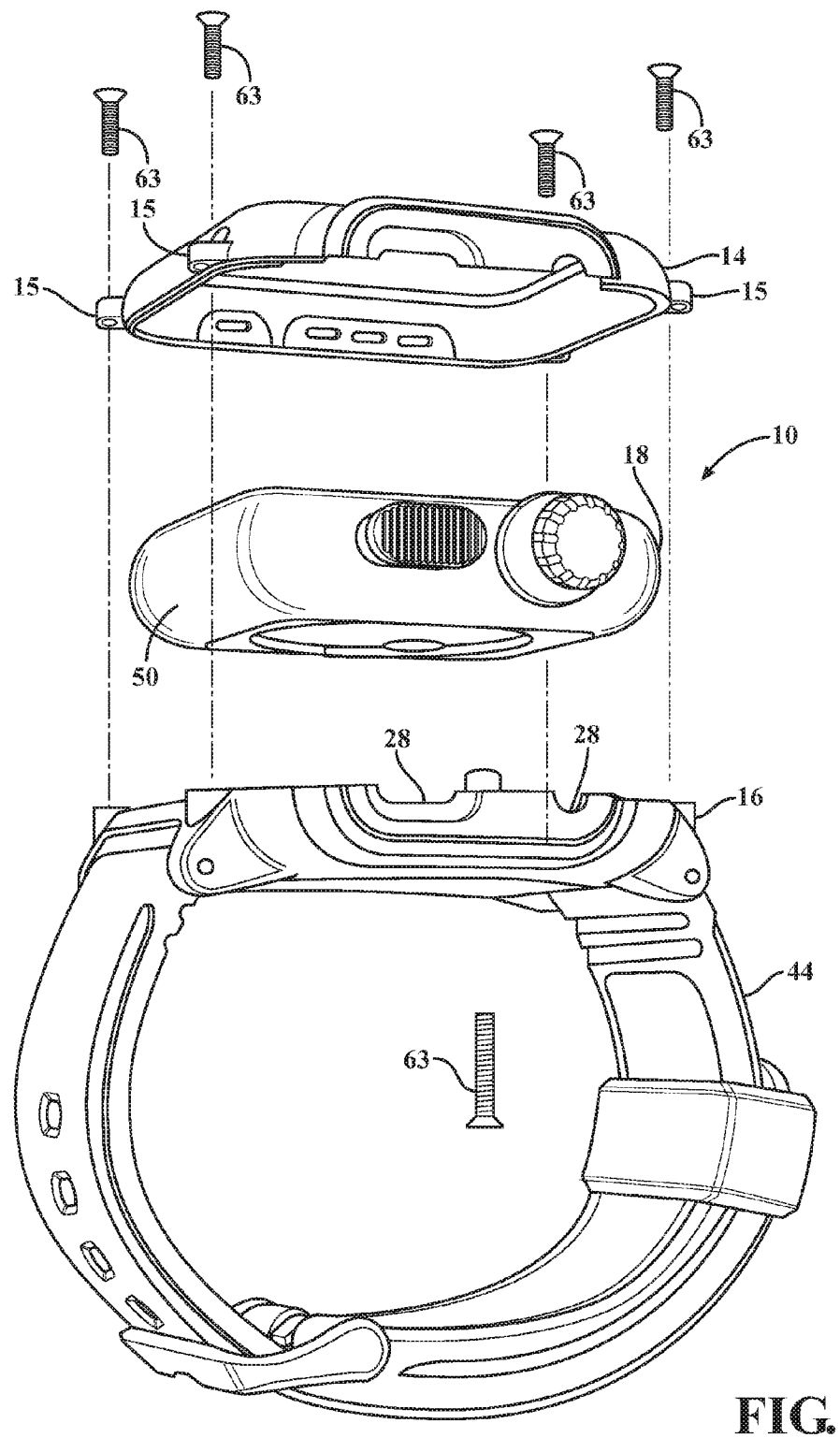
FIG. 23 is an exploded perspective view of an embodiment including attachment screws.
Figure 24:
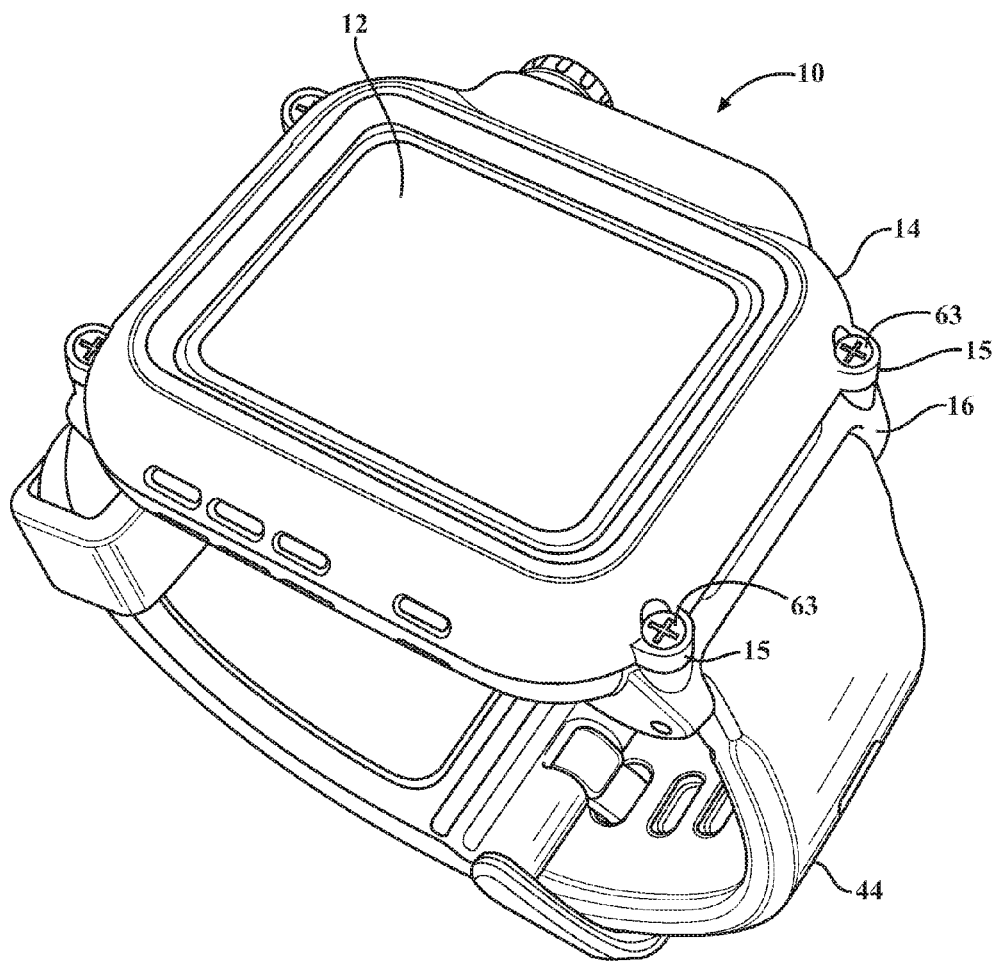
FIG. 24 is an assembled perspective view of the embodiment of FIG. 22.

Alternatively, the upper and lower housing members 14, 16 may be coupled or joined using screws 63 positioned at the corners of the housings 14, 16. Referring to FIGS. 22-24, the upper housing 14 may include projections 15 having a slot 17 formed therein. The screw 63 may pass through the slot and be received in a threaded projection 19 formed in the lower housing member 16. The position of the threaded projection 19 and the projection 15 may be reversed between the upper and lower housings 14, 16.

Figure 25:
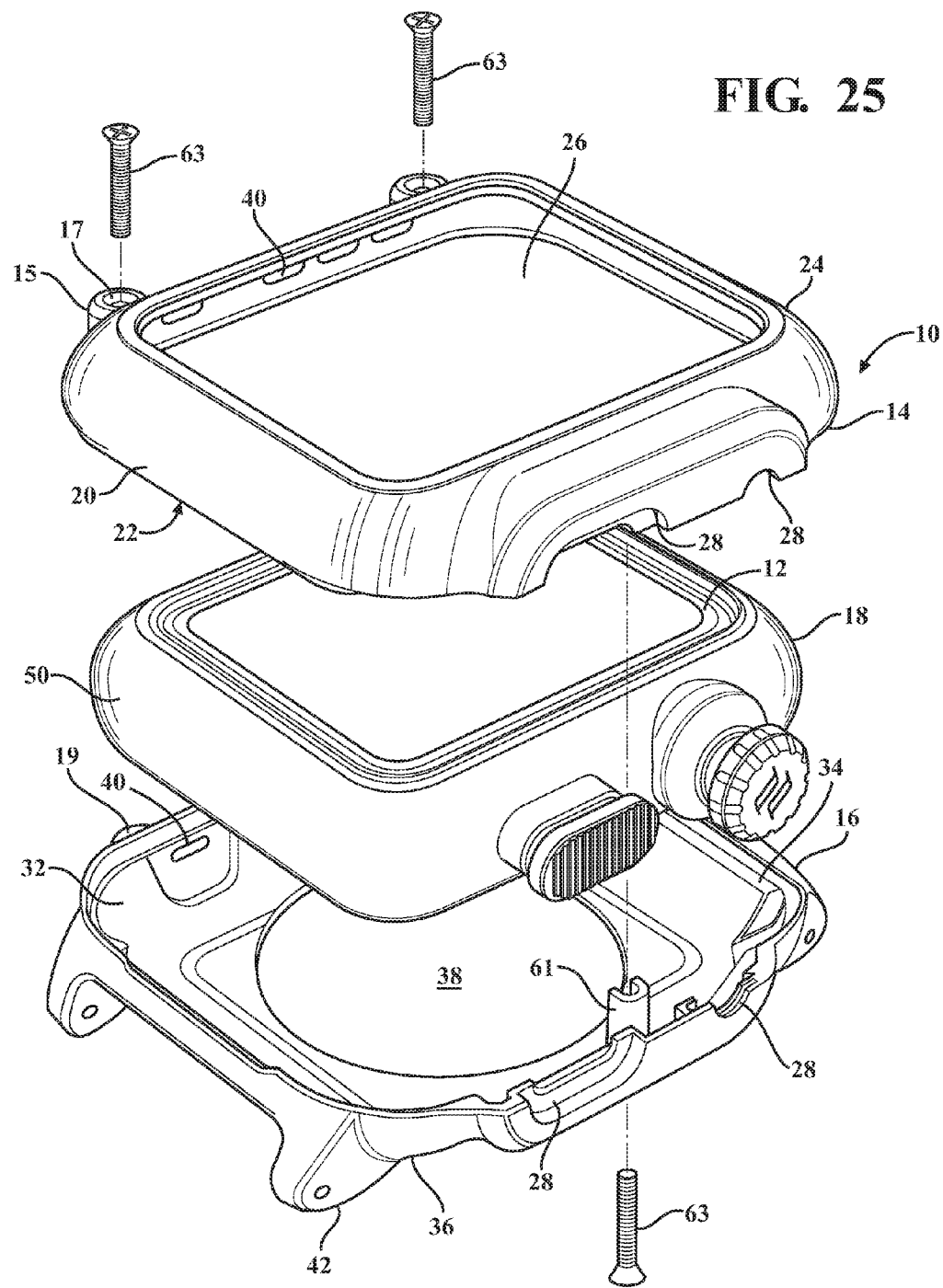
FIG. 25 is an exploded perspective view of another embodiment including attachment screws

In another aspect, the upper and lower housing members 14, 16 may be coupled or joined using screws 63 positioned at the corners of the housings 14, 16 in conjunction with the slot 61 and threaded bore 65 as described above. Referring to FIG. 25, the upper housing 14 may include projections 15 having a slot 17 formed therein. The screw 63 may pass through the slot and be received in a threaded projection 19 formed in the lower housing member 16. The position of the threaded projection 19 and the projection 15 may be reversed between the upper and lower housings 14, 16. Additionally, the lower housing 16 may also include a slot 61 formed therein that receives a screw 63 that is received in a threaded bore 65 of the upper housing 14.

The waterproof case 10 also includes a sealing wrap 18 structure, as shown in FIGS. 11-12. The sealing wrap 18 may be formed from a flexible material that may undergo deformation and is positioned about the electronic device 12. The material used for the wrap may be able to form a seal with the housing parts or electronic device by undergoing deformation when compressed or deformed in any way required to create a seal. However, the wrap material may also be resilient and return to its original shape and dimensions when removed from the device or housing. Materials for the wrap may include thermoplastic elastomers such as TPE/TPU, rubbers such as butyl, ethylene propylene, silicone, fluorosilicone, epichlorohydrin, chlorosulfonated polyethylene, fluoroelastomers, perfluoroelastomer, tetrafluoroethylene, tetrafluropropylene, polychloroprene, neoprene, urethane, ethylene propylene diene monomer (EPDM), or materials that may withstand environmental or chemical exposure to elements that may include water, heat, dirt, dust, rain, and snow, UV, ozone, oxidation, elasticity over a wide temperature range, and/or other elements such as chlorine or salt water. Plastic materials may also be used if they can form an effective seal with the main housing parts. In one aspect, the material of the sealing wrap 18 may allow light transfer and have material properties for acoustic transmission. The light may include light in the green spectrum or infrared spectrum. The wrap may also be made from two or more materials which have been co-molded, assembled using mechanical means or joined via adhesive or adhesive bonding tape. This will allow some areas of the wrap to be made from more flexible materials and other parts to be more rigid.

Figure 26:
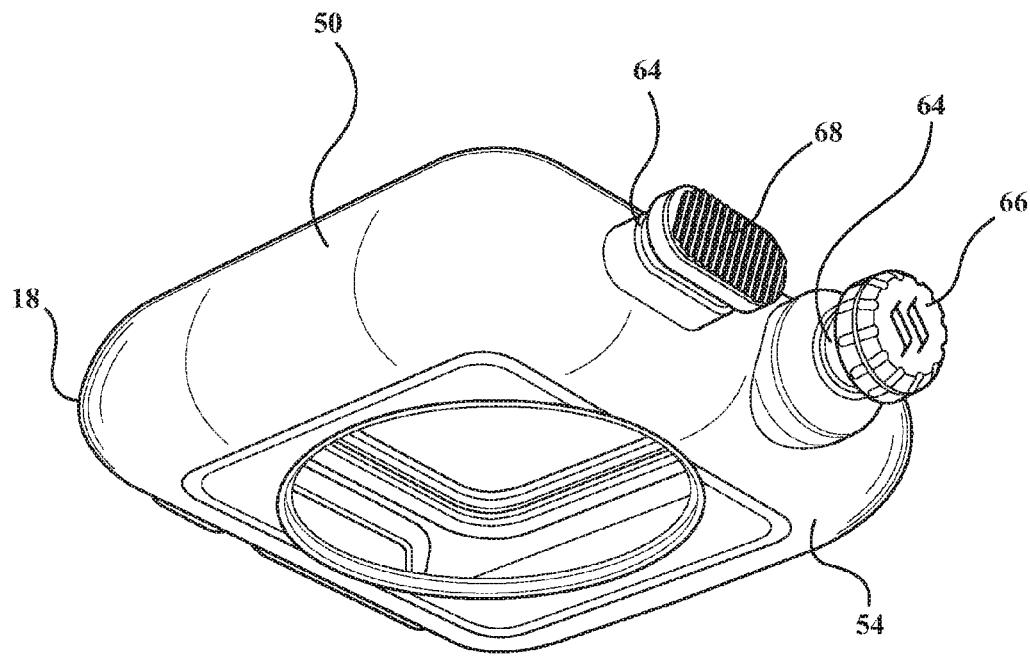
FIG. 26 is a partial perspective view of a waterproof case detailing the sealing wrap with an open bottom.
Figure 27:
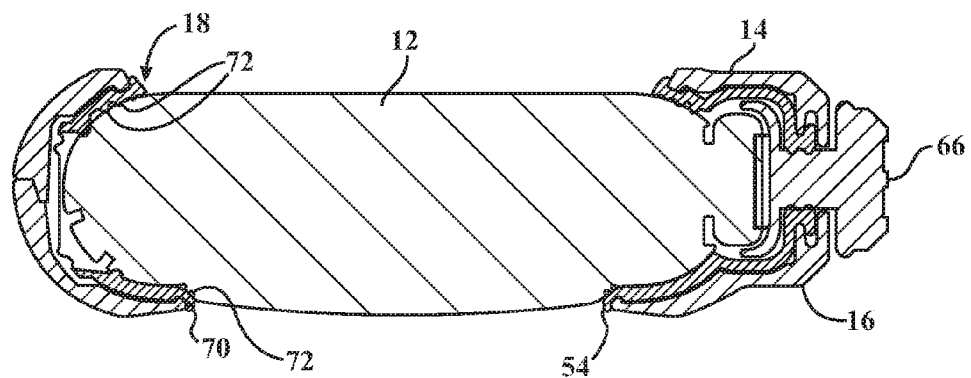
FIG. 27 is an assembled sectional view of the case for the electronic device including a sealing wrap with an open bottom.

In one aspect, the sealing wrap 18 includes a peripheral wall 50 having upper and lower walls 52, 54 connected thereto. In one aspect the upper wall 52 includes a cutout section 56 allowing access to a top surface of the electronic device 12. The lower wall 54 is contiguous with the peripheral wall 50 and may be formed of the same material. In one aspect, the lower wall 54 may include a wall section 58 that corresponds to a position of the opening 38 formed in the lower wall 36 of the lower housing 16. In one aspect, the wall section 58 may allow for transfer of light or input or output signals to and from the electronic device 12 through the opening 38 formed in the lower wall 36 of the lower housing 16. Various signals include visual, optical, electromagnetic, and infrared or other such signals. The hole for transmission of light or input/output signals may also be placed on other surfaces of the casing for example the top surface and the side surface may also incorporate these holes. In one aspect, the wall section 58 may include clear transparent portions 59 that allow a high degree of transmission of light or that may be formed of a thinner transparent portion that allows a high degree of transmission of light to be transmitted through the material or be formed of a material that has a similar refractive index as the surround medium to enable a high degree of light transmission. The optical transparency of the material may allow light transmission of specific wavelengths, such as those corresponding to infrared (IR), green, amber, blue, and/or red light. Alternatively, the wall section 58 may be removed such that the sealing wrap 18 is open on the bottom, as shown in FIGS. 26 and 27. In such an embodiment sealing structures 72 may be positioned on the bottom of the wrap 18 similar to seals 72 on the top of the sealing wrap 18 as will be discussed in more detail below. In one aspect the seals may also include the alignment features 70 as discussed in more detail below.

In one aspect, the peripheral wall 50 of the sealing wrap 18 may include a speaker membrane 60 made from a thin wall of the peripheral wall 50. Additionally, the peripheral wall 50 of the sealing wrap 18 may include a microphone membrane 62 again made from a thin wall section of the sealing wrap 18. In this embodiment, the speaker membrane may be positioned directly in front of the loudspeaker of the electronic device and likewise, for the microphone membrane may be positioned directly in front of the microphone of the electronic device. The speaker membrane 60 and microphone membrane 62 are formed on the sealing wrap 18 in a position that corresponds to the acoustic slots or holes 40 formed in the upper and lower housing members 14, 16. In this manner, acoustic energy is transferred through the acoustic slots or holes 40 through the thin membrane sections 60, 62 of the sealing wrap 18 allowing sound to be transmitted into and out of the case 10 to and from the electronic device 12.

In one aspect, the material of the sealing wrap 18 may have the correct properties for sound transmission such that it is flexible, and compliantly mounted or formed. In one aspect, the membranes 60, 62 may be monolithically formed of the sealing wrap 18 and are able to freely move in response to sound waves similar to a piston effect and define the degree of movement or vibration. The membranes 60, 62 may include an edge or boundary 67 when monolithically formed that allows membrane 60, 62 to compliantly move or vibrate freely. Equally important to the selection of the acoustic and waterproof membrane materials are the boundary conditions selected of how the membrane is monolithically formed or compliantly mounted as this will also affect the frequency range of the membrane. More compliant, less rigid boundary or mounting conditions will result in a lower frequency range. The lowest frequency of resonance of the membrane may be limited by mechanical and material parameters. In a compliantly mounted membrane, the low frequency mode of a membrane rigidly bonded to the surrounding housing may be determined to approximate the frequency response of a diaphragm defined as a free vibrating edge-clamped circular disc. The natural frequency of such a disc is determined by the equation. $f_{mn} = \alpha_{mn}/4\pi \times \sqrt{(E/3\rho(1-v^2))} \times (h/a^2)$: where $\alpha_{mn}$ is a vibrating modes constant of the diaphragm, h is the thickness of the diaphragm, a is the effective radius of the diaphragm, $\rho$ is the mass density of the diaphragm material, v is the Poisson's Ratio of the diaphragm material, and E is the Young's Modulus of the diaphragm material. The resonant frequency of the membrane may be governed by this equation. It will show up in the frequency response as a resonance and there may be other vibration modes at higher frequencies compared to the lowest mode given by this equation. Thus, in order to transfer energy from the acoustic membrane to the speaker, a low modulus is desirable. Specifically, a flexible membrane with low density is desirable so that the movement of the membrane is maximized when impacted by a sound wave such that the sound wave is then re-produced on the other side of the membrane. This resonance shows up as a peak in the frequency response of the speaker with membrane. It is further possible to tune the membrane frequency to provide additional output from the speaker-membrane unit. This can be achieved by compliant mounting or formation of the membrane. More rigid edge conditions for the membrane may result in a higher frequency response for the membrane. Hence, the mode frequency of the membrane may be dependent upon the Young's Modulus, density and diameter and thickness of the material.

In one aspect, the membrane material may be selected with Young's Modulus from 50 MPa up to 80 GPa and a density from 500 kg/m3 up to 2500 kg/m3. Some examples of such materials include thermoplastic films PEN, PI, PET, PBT, PE, PC, PVC, PP, EVA, PTFE; PVDF thermoplastic alloys, thermosets, thermoplastic elastomers such as TPE/TPU), rubbers such as butyl, ethylene propylene, silicone, fluorosilicone, epichlorohydrin, chlorosufonated polyethylene, fluoroelastomers, perfluoroelastomer, tetrafluoroethylene, tetrafluropropylene, polychloroprene, organic films such as, collagen films or films made of natural products like starch, proteins or synthetic polymers, ceramics, silicone films, metallic foils or metallized films including. Aluminum foil and plastic films with metal deposits, and multilayer systems composed of laminates of different combinations of materials such as PET with foil laminated together. The size of the membrane and the thickness of the material may also be chosen to achieve a specific frequency range. In one aspect, a thinner membrane will lower the membrane frequency response and conversely, a thicker membrane will result in a higher frequency response. A larger membrane will give a lower frequency response than a smaller membrane using the same material. For the purpose of a small device such as a telephone, mp3 player, video recorder, camera, headphones, and hearing aid, where the size of the membrane may be limited, the thickness of the membrane may ideally vary from 5 microns up to 2000 microns depending upon the material. The damping or energy absorption characteristics of the membrane also need to be considered. Higher damping (absorb more energy) materials will have a smoother frequency response and show less sharp peaks or resonances in their frequency response. This will result in a more natural sound transmission externally from a speaker. Conversely low damping materials such as metal foils or ceramics will have sharp resonances. A compliantly mounted or compliantly formed membrane includes a spring-like effect that allows the membrane to vibrate and act as an air piston responding to changes in air pressure to move the membrane allowing sound to transfer and increases an overall sound level. In some instances, sound from a sound source may be redirected within an air and watertight housing so that a sufficiently large sized membrane and sufficiently large sized air cavity is available to vibrate to act as an air piston.

In another aspect, an acoustic membrane such as the speaker and microphone membranes 60, 62 may be made of a suitable flexible material and can be compliantly mounted and attached to the sealing wrap 18 by adhesive, solvent, UV glue, or mechanical attachment or may be monolithically formed. The acoustic membrane material may be a different material to the wrap material and be co-molded onto the wrap material or assembled onto it via mechanical means, or joined by using an adhesive or adhesive bonding tape.

The peripheral wall 50 of the sealing wrap 18 may also include toggle slots 64 formed therein to accommodate a dial toggle 66 and button 68 as best shown in FIGS. 14-21. The wrap 18 may also include alignment features 70 formed thereon that align with the upper housing member 14 to position the sealing wrap 18 correctly with respect to the upper and lower housing members 14, 16. Additionally, the sealing wrap 18 includes axial seal members 72 that seal against the electronic device 12 when positioned within the sealing wrap 18 and the upper and lower housing members 14, 16. In the depicted figures the seal members include a pair of seals 72. Additionally, the sealing wrap 18 may also include a dust seal 73 formed thereon to prevent entry of dust into the seals 72. The sealing wrap 18 is shown and described as being axially sealed relative to the upper and lower housing members 14, 16. It is understood that the sealing wrap may also be sealed radially or otherwise compressed within the upper and lower housing members 14, 16. For example, the sealing wrap 18 may be compressed axially or radially between the upper or lower housing and the device or perpendicular to the assembly of the upper and lower housing members. In such an application, the upper housing may include a screen instead of an open top. The screen may be bonded to the upper housing or otherwise formed with the upper housing. Additionally, the seals may be different on the top and bottom of the device. For example either the upper or lower housing members may be sealed axially or radially.

Again referring to FIG. 14, the wrap 18 includes a slot 64, 74 formed therein to receive a cylindrical portion 76 of the dial toggle 66. The dial toggle 66 includes an actuator portion 80 that extends along the cylindrical portion 76 to a friction contact portion 84 that fits to a toggle or rotating feature on the device and when fit into the wrap cylindrical portion 76 that is positioned within the wrap 18 when assembled. There are three aspects to the design of the dial toggle assembly which may be used depending on the required activation methods of the electronic device. In one aspect, the friction contact portion 84 may include a part 85 that acts to keep tension on the toggle but returns to its original shape after a force is removed so that the device is not constantly activated. The part 85 may be formed of a material that acts as a spring to apply the desired tension as described above to activate a push button on the electronic device. In the second aspect, the material of part 85 may also have a surface friction which is high enough to allow a rotating movement to be passed through it so that a rotating toggle on the device can be activated. In the third aspect, the sealing wrap 18 includes waterproof seal structures 86 positioned about the slot 74 to interface with the dial toggle 66 and provide a seal about the shaft of the dial structure 76. For this sealing aspect, a double seal structure may be provided to seal about the rotatable dial structure 76. The sealing effect detailed in this third aspect can be achieved in several different ways either internal or external to the housing. The sealing aspect of the dial toggle may be performed but the requirement for high friction or compressibility of the assembly will depend on the activation methods of the electronic device.

Referring to FIGS. 14-21, the sealing wrap 18 may include acoustic sealing or isolation ribs 88 formed thereon that correspond to the microphone and speaker membranes 60, 62 formed in the peripheral wall 50. In one aspect, the isolation ribs 88 isolate acoustic energy between the microphone and speaker of the electronic device 12 and direct it into and out of the case 10.

Figure 17:
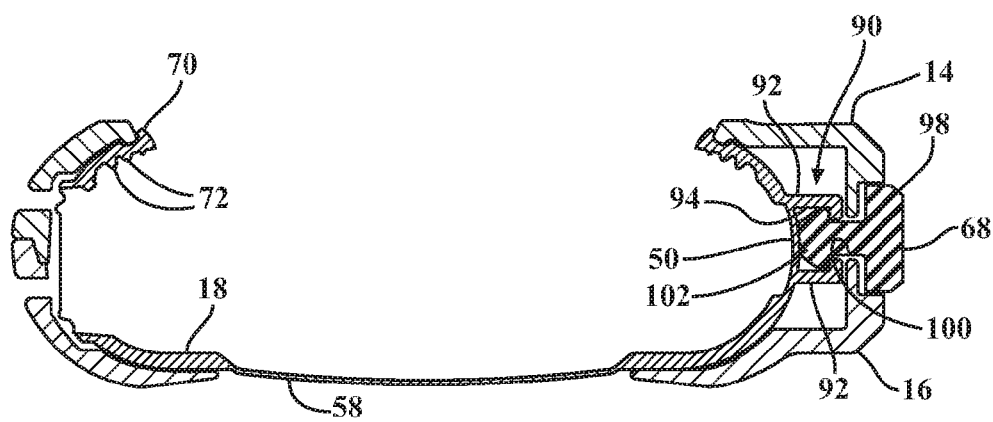
FIG. 17 is a sectional view of the waterproof case for an electronic device detailing acoustic structures and a button.
Figure 18:
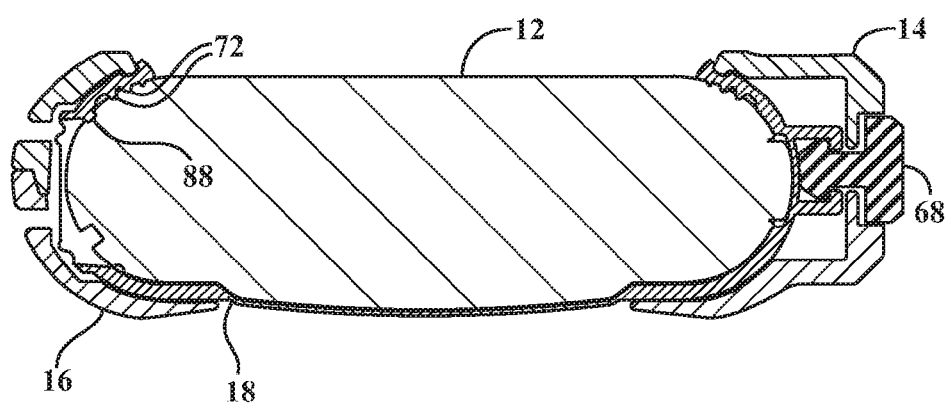
FIG. 18 is a sectional view of the waterproof case for an electronic device detailing acoustic structures and a button and a device.

Referring to FIGS. 17 and 18, the wrap 18 includes a button location structure 90. In one aspect, the button location structure 90 includes a pair of spaced walls 92 that extend from the peripheral wall 50 and define a cavity 94. The button toggle 68 includes an actuator portion 98 that extends along a shaft 100 to an interface portion 102. In one aspect, the interface portion 102 is positioned within the cavity 94 and contacts the peripheral wall 50 such that a user may move the button toggle 68 in and out and actuate various buttons on the electronic device 12 while the device remains sealed. The wrap 18 as described above includes structures that combine the functional and structural features such as acoustic membranes, acoustic seals, waterproof seals, optical sensors, buttons and toggles and wireless charging in a single component that is durable and cost effective.

In use, a user may position the electronic device 12 within the wrap 18 such that the speaker membrane 60 and microphone membrane 62 align with speaker and microphone structures of the electronic device 12. The button 68 and dial toggle 66 may be assembled with respect to the wrap 18 such that a user may actuate various switches of the electronic device 12. The electronic device 12 with the wrap 18 is positioned between the upper and lower housing members 14, 16 such that the upper and lower housing members 14, 16 may be coupled. The alignment features 70 correctly position the wrap 18 and device with relation to the upper housing 14. The upper and lower housing members 14, 16 may be coupled using the connection structures 30, 46 and screw 63 to securely retain the electronic device 12 and wrap 18 between the coupled upper and lower housing members 14, 16. Members 14 and 16 couple together causing compression such as an axial force of the seal 72. Alternatively, the screws 63 positioned on the corners of the housing as shown in FIGS. 22-24 may be utilized to couple the upper and lower housing members 14, 16. The axial seal structures 72 seal against the top surface of the electronic device 12 to prevent ingress of water or additional liquids into the case 10. The compliantly mounted membranes 60, 62 allow the clear transmission of acoustic energy to and from the device within the water proof case 10. For all the parts detailed here, the expansion and contraction of the materials due to temperature changes or environmental changes need to be considered. For examples, metals undergo larger dimensional changes due to temperature changes than plastics or rubbers and these dimensional changes may result in a seal being broken. Material properties in cold environments may also be considered when selecting the housing, wrap and any other materials to ensure continued function at lower temperatures or where temperature change quickly.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A waterproof case for an electronic device comprising:
an upper housing member;
a lower housing member;
a sealing wrap positioned about an electronic device, the sealing wrap positioned between the upper and lower housing members when the upper and lower housing members are coupled;
wherein the sealing wrap includes an alignment feature formed thereon, the alignment feature enclosing about an edge of the upper housing member and positioning the wrap within the upper and lower housing members wherein axial seal members formed on an inner surface of the wrap are compressed and engage a top surface of the device when the upper and lower housing members are coupled defining a continuous seal about the device.

2. The waterproof case of claim 1 including lugs formed thereon attaching to a strap member.

3. The waterproof case of claim 1 wherein the upper housing member includes a peripheral wall extending to an open bottom and a top portion, the top portion including a cut out, the upper housing member including connection structures formed thereon.

4. The waterproof case of claim 1 wherein the lower housing member includes a peripheral wall extending to an open top and a lower wall, the lower wall including an opening formed therein, the lower housing member including connection structures formed thereon.

5. The waterproof case of claim 1 wherein the sealing wrap including a peripheral wall extending to upper and lower walls, the upper wall including a cut out section accessing the device.

6. The waterproof case of claim 1 wherein the sealing wrap includes acoustic membranes compliantly mounted therewith transmitting sound into and out of the waterproof case from the device.

7. The waterproof case of claim 1 wherein the sealing wrap includes acoustic membranes monolithically formed thereon transmitting sound into and out of the waterproof case from the device.

8. The waterproof case of claim 6 wherein the acoustic membranes includes a speaker membrane and a microphone membrane.

9. The waterproof case of claim 1 wherein the sealing wrap includes isolation ribs formed thereon, the isolation ribs positioned to isolate acoustic energy between speaker and microphone membranes and directing the acoustic energy into and out of the waterproof case.

10. The waterproof case of claim 1 wherein the upper and lower housing members include acoustic holes formed therein and positioned to align with speaker and microphone membranes compliantly mounted on the sealing wrap allowing the transmission of acoustic energy.

11. The waterproof case of claim 1 wherein a lower wall of the sealing wrap includes a thin walled section formed thereon, the thin walled section having transparent portions allowing the transmission of light.

12. The waterproof case of claim 11 wherein the transparent portions allow the transmission of green spectrum light and infrared light.

13. The waterproof case of claim 1 wherein the upper and lower housing members include cutout slots formed therein, a dial toggle and a button toggle positioned in the cutout slots.

14. The waterproof case of claim 13 wherein the dial toggle includes an actuator portion that extends along a cylindrical portion to a friction contact portion that that engages a rotating feature on the device, the cylindrical portion received in a toggle slot formed in the sealing wrap.

15. The waterproof case of claim 14 wherein the friction contact portion includes a part keeping a specified tension and grip on the rotating feature of the device.

16. The waterproof case of claim 14 wherein the sealing wrap includes waterproof seal structures positioned about the toggle slot sealing about the cylindrical portion.

17. The waterproof case of claim 13 wherein the sealing wrap includes a button location structure having a pair of spaced walls that extend from a peripheral wall of the sealing wrap and define a cavity and the button toggle including an actuator portion that extends along a shaft to an interface portion positioned within the cavity and contacting the peripheral wall.

18. A waterproof case for an electronic device comprising:
an upper housing member including cutout slots formed therein;
a lower housing member including cutout slots formed therein;
at least one of the upper or lower housing members including lugs formed thereon attaching to a strap member;
a sealing wrap shaped to be positioned about an electronic device, the sealing wrap positioned between the upper and lower housing members and compressed defining a seal when the upper and lower housing members are coupled;
a button toggle positioned in the cutout slots;
wherein the sealing wrap includes a button location structure having a pair of spaced walls that extend from a peripheral wall of the sealing wrap and define a cavity, and the button toggle including an actuator portion that extends along a shaft to an interface portion positioned within the cavity and contacting the peripheral wall.

19. The water proof case of claim 18 wherein the sealing wrap includes axial seal members formed on the wrap that are compressed and engage the device when the upper and lower housing members are coupled defining a continuous seal about the device.

20. The waterproof case of claim 18 wherein the sealing wrap includes a peripheral wall extending to upper and lower walls, the upper or lower wall or both including a cut out section accessing the device.

21. The water proof case of claim 18 wherein the upper and lower housing members include cutout slots formed therein receiving both a dial toggle and a the button toggle wherein the dial toggle includes an actuator portion that extends along a cylindrical portion to a friction contact portion that engages a rotating feature on the device, the cylindrical portion received in a toggle slot formed in the sealing wrap, the sealing wrap including waterproof seal structures positioned about the toggle slot sealing about the cylindrical portion.

22. The water proof case of claim 18 wherein the sealing wrap includes a lower wall having a thin walled section formed thereon, the thin walled section having transparent portions allowing the transmission of light.

23. A waterproof case for an electronic device comprising:
an upper housing member including cutout slots formed therein;
a lower housing member including cutout slots formed therein;
a dial toggle positioned in the cutout slots;
at least one of the upper or lower housing members including lugs formed thereon attaching to a strap member;
a sealing wrap shaped to be positioned about an electronic device, the sealing wrap positioned between the upper and lower housing members and compressed defining a seal when the upper and lower housing members are coupled wherein the sealing wrap includes a toggle slot formed therein and wherein the dial toggle includes an actuator portion that extends along a cylindrical portion to a friction contact portion that that engages a rotating feature on the device, the cylindrical portion received in the toggle slot formed in the sealing wrap.

24. The water proof case of claim 23 wherein the sealing wrap includes axial seal members formed on the wrap that are compressed and engage the device when the upper and lower housing members are coupled defining a continuous seal about the device.

25. The waterproof case of claim 23 wherein the sealing wrap includes a peripheral wall extending to upper and lower walls, the upper or lower wall or both including a cut out section accessing the device.

26. The water proof case of claim 23 wherein the sealing wrap includes a lower wall having a thin walled section formed thereon, the thin walled section having transparent portions allowing the transmission of light.

* * * * *